Nov. 19, 1968   H. B. SCHULTHEIS, JR   3,411,348
ELECTRONIC DYNAMOMETER
Filed June 30, 1966

INVENTOR.
HARRY B. SCHULTHEIS JR.
BY
Elliott & Pastoriza
ATTORNEYS

United States Patent Office 3,411,348
Patented Nov. 19, 1968

3,411,348
ELECTRONIC DYNAMOMETER
Harry B. Schultheis, Jr., Woodland Hills, Calif., assignor to W. C. Dillon & Company, Inc., a corporation of California
Filed June 30, 1966, Ser. No. 561,957
4 Claims. (Cl. 73—141)

ABSTRACT OF THE DISCLOSURE

A dynamometer in the form of a flexible bar arranged to bend under a loading force is provided. Measurements of the force are effected by strain gauges secured to an elongated flexure member running parallel to the top surface of the bar and having one end rigidly secured to the bar. The other end in turn rides over a roller structure rigidly secured adjacent to another end of the bar the flexure member thus being flexed upon bending of the bar. Electrical output signals indicative of the loading are derived from changes in the physical lengths of the strain gauges secured to the flexure member. The natural resonant frequency of the bar is different from the natural resonant frequency of the flexure member so that sudden release of loads will not damage the instrument, the bar motion tending to damp out vibrations in the flexure member.

---

This invention relates generally to dynamometers and more particularly to dynamometers utilized in measuring exerted forces and adapted to be electrically coupled to an electronic read-out device.

In testing structural members and the like for load-bearing capacity and other design criteria, it is common practice to subject the members to tensile or compressive loading in testing machines to determine the ultimate design of the member for a particular application.

Such testing often includes loading the member until it fails or breaks, thereby producing a sudden shock load on the associated testing and measuring apparatus. With presently known force measuring devices, such shock loads may damage the device and render it inaccurate for subsequent use.

Another disadvantage associated with many presently known force measuring devices is that the range of loads which may be measured by a particular device is limited such that testing members through a wide range of loads may require the use of several different force measuring devices.

With the foregoing in mind, it is accordingly a primary object of the present invention to provide a dynamometer which is not damaged or rendered inaccurate by shock loads caused by the sudden release of the force imposed thereon.

More particularly, it is an object to provide a dynomometer which will yield linear readings proportional to the force imposed thereon and be susceptible of a higher degree of sensitivity and accuracy than with many presently known force measuring devices.

Another object is to provide a dynamometer which is simple and rugged in construction and which will accommodate a wide range of loads with a minimum number of adjustments.

Another object is to provide a dynamometer which is designed to co-function accurately with different types of electronic indicating devices to the end that the dynamometer may be used in a wide variety of force measuring applications.

Yet another object is to provide a dynamometer which may be readily adjusted to compensate for normal manufacturing tolerances.

Briefly, these and many other objects and advantages of this invention are attained by providing a dynamometer preferably including a flexible bar adapted to the coupled to suitable means for exerting a force on the bar for deflecting the bar according to the magnitude of force applied.

The dynamometer further includes an elongated flexure member rigidly secured at one end to the bar and extending along a portion thereof to terminate at its other end proximate to a support means. The support means may be adjusted to preload the flexure member. The flexure member is preferably constructed with a first portion of its longitudinal extent being of a given cross-sectional area and with an integral second portion having a cross-sectional area less than the cross-sectional area of the first portion. The ratio between these areas, and the ratio between the lengths of the first and second portions, may be controlled to provide a highly sensitive and accurate device, from which tensile and compressive forces may be transduced through appropriate electronic means.

Toward the above end, conventional resistance type strain gages may be bonded or similarly secured on the flexure member and electrically connected to electronic read-out instrumentation for indicating the magnitude of the force exerted on the bar.

A better understanding of the invention will now be had by referring to a preferred embodiment thereof as illustrated in the accompanying drawings, in which.

Figure 1:
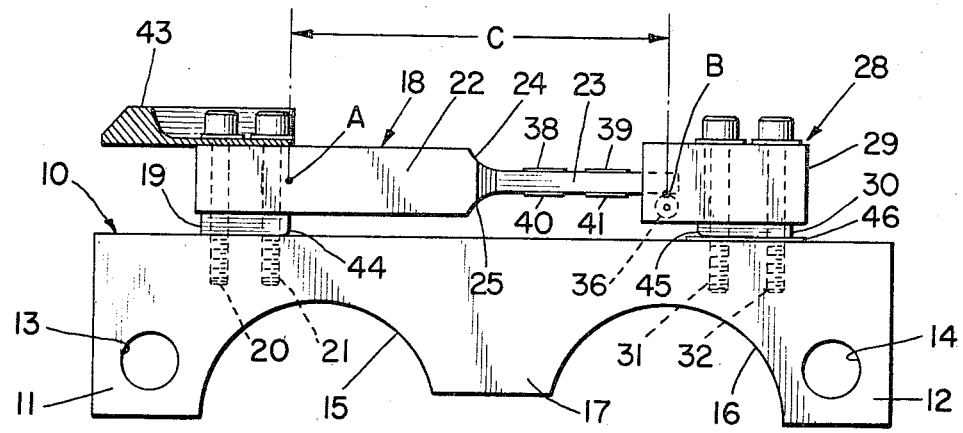
FIGURE 1 is a front elevation view of the dynamometer in accordance with the invention.

Referring first to FIGURE 1, there is shown a dynamometer according to the present invention which includes a bar 10 having at its opposing ends angularly disposed portions 11 and 12 integrally formed therewith. The angularly disposed end portions 11 and 12 include, respectively, openings 13 and 14 for coupling to means for exerting a force on the bar 10. The end portions 11 and 12 are partially defined by semicircular edge portions 15 and 16, respectively, which define an intermediate portion 17 therebetween. It will be apparent to those skilled in the art that the openings 13 and 14 may receive means for supporting the bar 10 while a downward force is applied to the bar at the intermediate portion 17. The bar structure as such is not deemed to be new or form a part of the present invention except insofar as it functions together with the remainder of the structure in an overall combination.

Figure 3:
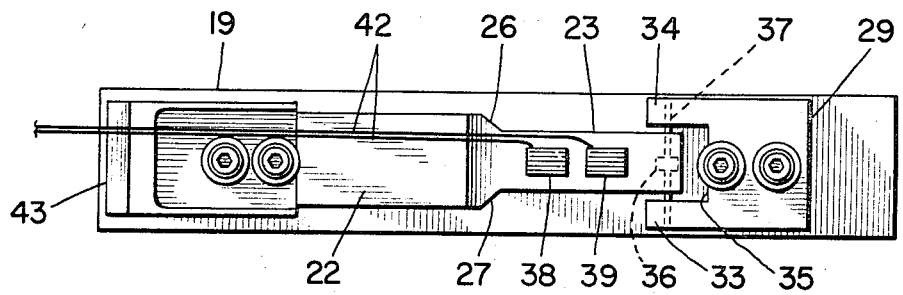
FIGURE 3 is a top plan view of the dynamometer of FIGURE 1.

In accordance with the invention and referring to FIGURES 1 and 3, an elongated flexure member 18 is positioned on the top surface of the bar 10 and has one end thereof positioned on a support block 19 secured to the bar 10 proximate to the end portion 11 by means of bolts 20 and 21. The flexure member 18 is spaced from and extends in a direction parallel to the bar 10. The flexure member 18 includes a first portion 22 of a given cross-sectional area, integrally formed with a second portion 23 having a cross-sectional area less than that of the first portion 22. The portions 22 and 23 are joined by curved portions 24, 25, 26 and 27, each formed on a given radius of curvature.

From the foregoing it is apparent that the flexure member 18 provides a stepped cantilever type arrangement in conjunction with the bar 10. In practice, the flexure member 18 is preferably constructed of a heat-treated steel or aluminum alloy which exhibits high elasticity and low hysteresis effects.

The flexure member 18 is desiged to flex in response to deflection of the bar 10, and toward that end, a support structure 28 is rigidly coupled to the bar proximate to the end portion 12. The support structure 28 includes a support block 29 mounted on a plate 30, which together are coupled to the top of the bar 10 by bolts 31 and 32.

As best shown in FIGURE 3, the support block 29 is bifurated to define flanges 33 and 34 which form a slot 35 for receiving an end of the flexure member 18.

The support structure 28 is preferably designed to permit relative longitudinal movement between the structure 28 and that flexure member 18 in response to force exerted on the bar 10. Toward this end, a roller member 36 is positioned on the support structure 28 within the slot 35 and is mounted on a pin 37 mounted in the flanges 33 and 34. The roller member 36 preferably engages the underside of the flexure member 18 proximate to the outer or free end of the second portion 23 at point A. As measured from a reference point B, the effective flexible length of the flexure member 18 is indicated by C when the bar 10 is in an unloaded and unflexed position as shown in FIGURE 1.

As shown in FIGURE 3, the roller 36 is positioned on the pin 37 midway between the flanges 33 and 34 and is of substantially less width than that of the flexure member 18. Accordingly, torsion or twisting of the flexure member 18 about its longitudinal axis is accommodated by the roller 36 without causing an accompanying change in the displacement of the flexure member 18, thereby providing more accurate readings as will become clearer as the description proceeds.

In order to transduce the deflection of the flexure member 18 into measurable readings, a plurality of conventional resistnce type strain gages 38 through 41 are bonded on the portion 23 of the flexure member 18. In a typical example, the gages 38 and 39 are bonded on the upper surface of the portion 23 and the gages 40 and 41 are bonded on the underside thereof. The gages are adapted to be electrically coupled through lead wires 42 to appropriate remote electronic read-out instrumentation (not shown). Toward this end, a terminal bracket 43 is secured on the flexure member 18 by means of the bolts 20 and 21 and serves as a convenient means upon which the lead wires 42 may be joined to an electrical conduit (not shown) leading to the read-out instruments.

As will become clear in the subsequent description of operation of the dynamometer, the imposition of localized stresses in the bar 10 during deflection thereof may be reduced by rounding the lower corners of the support members 19 and 30 as shown at 44 and 45, respectively.

The dynamometer of the invention is designed to produce linear readings proportional to the force applied thereto. Among other features toward that end, the dynamometer includes means for adjusting the position of the roller 36 with respect to the flexure member 18 prior to the application of a force on the bar 10. The roller 36 may be moved upwardly to engage the underside of the flexure member 18 to slightly flex the same, whereby no lag occurs between applying a load on the bar 10 and deflection of the flexure member 18. Toward that end, a shim 46 may be positioned between the bar 10 and the support plate 30 to accordingly raise the roller 36 a predetermined distance from the bar 10, thereby causing the flexure member 18 to be slightly flexed. This preloading feature of the invention also enables the manufacturing tolerance requirements of the dynamometer to be reduced with no reduction in operational accuracy. While only one shim has been shown, it will be understood that additional shims could be used if required.

Figure 2:
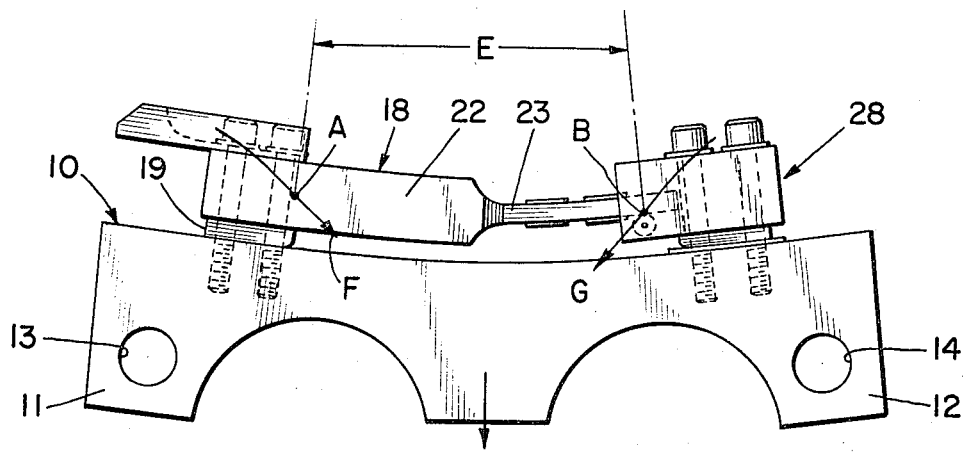
FIGURE 2 is a front elevation view of the dynamometer of FIGURE 1 illustrating in exaggerated form the deflection of the dynamometer in response to forces exerted thereon.

In operation and with reference to FIGURE 2, it will be seen that application of force on the bar 10 in the direction or arrow D will deflect the bar into a configuration similar to that shown (exaggerated for purposes of clarity) when the bar 10 is supported through the openings 13 and 14. The deflection is, in turn, transmitted to the flexure member 18, with the roller 36 supporting the underside of the portion 23 as shown. It is apparent that the second portion 23 will be more responsive to flexure than the relatively larger portion 22 due to the difference in cross-sectional area therebetween. It will further be apparent that the resistance type strain gages 38 and 39 will tend to shorten in longitudinal extent, while the gages 40 and 41 will tend to lengthen, thereby varying the electrical resistance of each gage. This change in resistance will then induce a change in the electrical current passing through the gages and lead wires to the read-out instruments. Accordingly, the readings on the instruments will indicate the magnitude of the force applied to the bar 10.

The advantages of the invention in regard to accuracy may be better understood by considering the nature of the characteristics of a flexure member such as shown at 18.

As heretofore stated, the effective length of the member 18 in an unloaded and unflexed condition is indicated by the distance C measured between points A and B, as shown in FIGURE 1. Due to the provision of the roller 36 supporting the end of the member 18, it is apparent in FIGURE 2 that the horizontal distance E as measured between the points A and B will be less than the distance C shown in FIGURE 1 when the bar 10 and flexure member 18 are deflected by the force applied in the direction of arrow D. The effective length E decreases due to the rotation of the points A and B about the centers of the openings 13 and 14 respectively, in the direction of arrows F and G, respectively. The dynamometer is designed such that the rate of reduction in the effective length of the portion 23 of the flexure mmeber 18 decreases with an increase in the applied load.

At the same time, the rotation of the points A and B causes the points to be lowered, and at an increasing rate as the applied load is increased. The dynamometer is designed such that the rotation of the points A and B causes a reduction in the rate of increase of the deflection of the portion 23 of the member 18 and consequently, in the strain in the portion 23. The two effects of decreasing the rate of reduction in the effective length and the reduction in the rate of increase of the deflection, can be controlled to cancel each other to produce linear readings proportional to the applied load. Thus, the increase in sensitivity resulting from the reduction of the flexure's effective length automatically compensates for decrease in sensitivity caused by the increasing rate of the lowering of the roller, in response to loading on the bar 10.

An important feature of the invention relates to the manner in which the dynamometer functions when the force on the bar 10 is suddenly released, as, for example, when a member being tested fails under load. The mass of the bar 10 is greater than that of the flexure member 18, such that upon release of the load, the bar 10 will have a resonant frequency lower than that of the flexure member 18. Consequently, the natural vibratory motion of the flexure member 18 will be constrained and dampened by the motion of the bar 10.

The dynamometer as above described is designed to produce linear readings on the remote read-out instruments which are proportional to the force exerted on the bar. Among other features above described toward that end, the ratio of the cross-sectional areas of the flexure member may be varied, as well as the ratio of the lengths of the two portions of the flexure member, to produce optimum results.

While the flexure member and its associated supporting means have been shown and described with reference to the bar 10, it will be understood that the flexure member and supporting means may be mounted on other members if operational conditions so require.

Various changes falling within the scope and spirit of this invention will occur to those skilled in the art. The dynamometer is therefore not to be thought of as limited to the specific embodiment set forth.

I claim:
1. A dynamometer adapted to be electrically coupled to a read-out device, said dynamometer comprising: a flexible bar having a first natural resonant frequency in response to a suddent release of a bending force thereon; said flexible bar bending when subjected to a load; a flexure member having a first end rigidly coupled adjacent to one end of said bar and extending along a portion of the bar in spaced relation thereto in cantilivered fashion; support means rigidly coupled to said bar adjacent to its other end for engaging the underside of the free end of said flexure member, whereby said flexure member is constrained to flex in accordance with the bending of said bar when a load is applied to said bar; and, strain gage means bonded on said flexure member for flexing therewith, said gage means adapted to be electrically coupled to the read-out device, said mass of said bar being greater than the mass of said flexure member whereby deflection of said bar and flexure member is electrically transmitted to said read-out device, and whereby sudden release of an applied load results in said bar vibrating at a resonant frequency lower than the resonant frequency of said flexure member so that vibrations of said flexure member are dampened by said bar.

2. The subject matter of claim 1, in which said support means includes a roller assembly engaging said underside of said flexure member, whereby said flexure member is movable on said roller assembly in response to bending of said bar.

3. A dynamometer adapted to be electrically coupled to an electronic read-out device, said dynamometer comprising: a flexible bar having integral angularly disposed end portions and a planar top surface, said flexible bar adapted to be subjected to a force for deflecting the bar according to the magnitude of the applied force; an elongated flexure member rigidly coupled at a first end thereof to said planar top surface of said bar proximate to one of said end portions, said flexure member extending along said surface in generally parallel spaced relationship thereto when in unflexed condition and including a portion of reduced cross section terminating in a second end proximate to the other of said end portions of said bar; support means rigidly coupled to the top surface of said bar proximate to said other of said end portions, said support means including a roller assembly disposed above said top surface to support the underside of said second end of said flexure member in a manner permitting longitudinal movement thereover; and resistance strain gages bonded on said flexure member adapted to be electrically coupled to the electronic read-out device, whereby deflection of said bar imparts flexure to said flexure member against said roller assembly, thereby varying the length of said strain gages to provide appropriate signals in said read-out device.

4. The subject matter of claim 3, including means associated with said support means for positioning said roller member at predetermined distances from said bar, to thereby flex said flexure member prior to the application of force on said bar.

References Cited

UNITED STATES PATENTS

| 2,712,645 | 7/1955 | Keene | 338—6 XR |
| 2,855,489 | 10/1958 | Ruge | 73—88.5 XR |
| 3,327,270 | 6/1967 | Garrison | 73—88.5 XR |

RICHARD C. QUEISSER, *Primary Examiner.*

C. A. RUEHL, *Assistant Examiner.*